(12) United States Patent
Andre

(10) Patent No.: US 9,064,609 B2
(45) Date of Patent: Jun. 23, 2015

(54) MECHANICAL CONNECTIONS AND METHODS

(75) Inventor: Lee J. Andre, Wilmington, NC (US)

(73) Assignee: GE-HITACHI NUCLEAR ENERGY AMERICAS LLC, Wilmington, NC (US)

(*) Notice: Subject to any disclaimer, the term of this patent is extended or adjusted under 35 U.S.C. 154(b) by 629 days.

(21) Appl. No.: 13/472,701

(22) Filed: May 16, 2012

(65) Prior Publication Data

US 2013/0308737 A1    Nov. 21, 2013

(51) Int. Cl.
G21C 9/00 (2006.01)
G21C 15/22 (2006.01)
G21C 17/017 (2006.01)
G21C 19/20 (2006.01)

(52) U.S. Cl.
CPC .......... *G21C 15/22* (2013.01); *Y10T 29/49826* (2015.01); *Y10T 403/32008* (2015.01); *G21C 17/017* (2013.01); *G21C 19/207* (2013.01); *Y02E 30/40* (2013.01)

(58) Field of Classification Search
None
See application file for complete search history.

(56) References Cited

U.S. PATENT DOCUMENTS

| 3,907,444 | A | * | 9/1975 | Arant | 403/77 |
|---|---|---|---|---|---|
| 4,179,104 | A | * | 12/1979 | Skinner et al. | 267/154 |
| 5,947,529 | A | | 9/1999 | Jensen | |
| 6,131,962 | A | | 10/2000 | Jensen et al. | |
| 6,375,130 | B1 | | 4/2002 | Jensen et al. | |
| 6,456,682 | B1 | | 9/2002 | Jensen | |
| 7,724,863 | B2 | | 5/2010 | Jensen | |
| 8,328,239 | B2 | | 12/2012 | BÄVersten et al. | |
| 2006/0082139 | A1 | * | 4/2006 | Jensen | 285/192 |
| 2009/0088751 | A1 | * | 4/2009 | Mullaney | 606/59 |
| 2010/0246744 | A1 | | 9/2010 | Wroblewski et al. | |
| 2011/0040331 | A1 | * | 2/2011 | Fernandez et al. | 606/264 |

FOREIGN PATENT DOCUMENTS

| JP | 2008-082991 | 4/1991 |
|---|---|---|
| JP | 2006-113065 A | 4/2006 |
| JP | 2010-513920 A | 4/2010 |

OTHER PUBLICATIONS

Jan. 27, 2015, Office Action from the Japan Patent Office issued in corresponding JP Application No. 2013-100821 A (with translation).

* cited by examiner

*Primary Examiner* — Jack W Keith
*Assistant Examiner* — Marshall O'Connor
(74) *Attorney, Agent, or Firm* — Harness, Dickey & Pierce, PLC

(57) ABSTRACT

A mechanical connection between adjacent components of a system may include a first component of the system, a second component of the system, and a multiple degree-of-freedom connection between the first and second components. The multiple degree-of-freedom connection may have at least four degrees of freedom. A method for establishing a mechanical connection between adjacent components of a system may include disposing a first component of the system adjacent to a second component of the system, and connecting the first component to the second component using a multiple degree-of-freedom connection. The multiple degree-of-freedom connection may have at least four degrees of freedom.

20 Claims, 14 Drawing Sheets

MECHANICAL CONNECTIONS AND METHODS

BACKGROUND

1. Field

Example embodiments generally relate to mechanical connections and methods. Example embodiments also relate to nuclear plants and to mechanical connections and methods for repairing piping within reactor pressure vessels of the nuclear plants.

2. Description of Related Art

A reactor pressure vessel ("RPV") of a boiling water reactor ("BWR") may have a generally cylindrical shape and/or may be closed at both ends (e.g., by a bottom head and a removable top head). A core shroud, or shroud, may surround the reactor core and may be supported by a shroud support structure.

BWRs have numerous piping systems, and such piping systems may be utilized, for example, to transport water throughout the RPV. For example, core spray piping may be used to deliver water from outside the RPV to core spray spargers inside the RPV. The core spray piping and/or spargers may deliver water flow to the reactor core.

In the event of a reactor plant casualty, such as a loss of coolant accident ("LOCA"), cooling water may be delivered to the reactor core through a core spray distribution header that may include a horizontal section and/or a vertical section. The vertical section may be referred to as a downcomer pipe. Water from the downcomer pipe may flow to sparger distribution header pipes inside the RPV via, for example, a sparger T-box.

If required, repair of piping between the downcomer pipe and the distribution headers may include the use of a coupling apparatus. The coupling apparatus also may be used in the event of full piping replacement. Related art coupling apparatuses are discussed, for example, in U.S. Pat. No. 5,947,529 to Jensen ("the '529 patent") and U.S. Pat. No. 6,131,962 to Jensen et al. ("the '962 patent"). The disclosures of the '529 patent and the '962 patent are incorporated in this application by reference in their entirety.

Intergranular stress corrosion cracking ("IGSCC") is a known phenomenon occurring in reactor components, such as structural members, piping, fasteners, and welds, exposed to high temperature water. The reactor components may be subject to a variety of stresses associated with, for example, differences in thermal expansion, the operating pressure needed for the containment of the reactor cooling water, and/or other sources such as residual stresses from welding, cold working, and other inhomogeneous metal treatments. In addition, water chemistry, welding, heat treatment, and/or radiation may increase the susceptibility of metal in a component to IGSCC.

Conditions may exist in the reactor that contribute to IGSCC of the core spray piping. One area of susceptibility in the core spray piping may be the welded joints between the sparger T-box and its associated distribution headers. The sparger T-box may be the junction where the core spray downcomer pipe penetrates the shroud and/or branches to sparger distribution header pipes. Specifically, the sparger T-box may be a straight section of pipe capped by a flat plate welded to the end of the pipe. Two sparger pipes may be welded to the sparger T-box, forming a piping tee. These three welded joints may be susceptible to cracking and, in the event that through-wall circumferential cracking should occur at these welded joints, unpredictable leakage may occur.

Another area of concern may be to ensure that the core spray system may prevent excessive fuel clad temperature in the event of a LOCA by delivering cooling water to the core region of the reactor. In the event that through-wall circumferential cracking should occur at these welded joints, the system may be compromised.

In order to prevent unacceptable leakage and to ensure that the core spray system delivers the necessary volumetric flow rate to the reactor core, it may be desirable to provide a clamping system to ensure structural integrity of the sparger T-box and/or to hold the welded joints together in the event that one or more of these welds fail.

Related art clamping systems are discussed, for example, in U.S. Pat. No. 6,456,682 B1 to Jensen ("the '682 patent") and U.S. Pat. No. 7,724,863 B2 to Jensen ("the '863 patent"), as well as U.S. Patent Publication No. 2010/0246744 A1 to Wroblewski et al. ("the '744 publication"). The disclosures of the '682 patent, the '863 patent, and the '744 publication are also incorporated in this application by reference in their entirety.

SUMMARY

Example embodiments may provide mechanical connection devices and methods for repairing piping within reactor pressure vessels of such nuclear plants. Example embodiments also may provide mechanical connection devices and methods for mechanically clamping the core spray downcomer piping to the shroud, and structurally replacing welds that attach the cover plate and sparger pipe to the sparger T-box.

In example embodiments, a core spray sparger T-box attachment assembly for a nuclear reactor pressure vessel is disclosed. The pressure vessel may include a shroud, a sparger T-box penetrating the shroud, a plurality of sparger distribution header pipes coupled to the sparger T-box, and/or a downcomer pipe. The sparger distribution header pipes may include at least one sparger nozzle. The attachment assembly may include a downcomer pipe coupling and/or a sparger T-box clamp. The sparger T-box clamp may include an anchor plate having a draw bolt opening to receive a draw bolt, a first clamp block substantially aligned at a first end of the anchor plate, and/or a second clamp block substantially aligned at a second end of the anchor plate. The anchor plate may be connected to the first clamp block by a first multiple-degree-of-freedom connection. The anchor plate may be connected to the second clamp block by a second multiple-degree-of-freedom connection.

In example embodiments, the first multiple-degree-of-freedom connection may have at least two degrees of freedom.

In example embodiments, the first multiple-degree-of-freedom connection may have at least two degrees of freedom that include one or more of roll, pitch, and yaw.

In example embodiments, the first multiple-degree-of-freedom connection may have at least two degrees of freedom that include two or more of roll, pitch, and yaw.

In example embodiments, the first multiple-degree-of-freedom connection may have at least three degrees of freedom.

In example embodiments, the first multiple-degree-of-freedom connection may have at least three degrees of freedom that include one or more of roll, pitch, and yaw.

In example embodiments, the first multiple-degree-of-freedom connection may have at least three degrees of freedom that include two or more of roll, pitch, and yaw.

In example embodiments, the first multiple-degree-of-freedom connection may have at least three degrees of freedom that include roll, pitch, and yaw.

In example embodiments, the first multiple-degree-of-freedom connection may have at least four degrees of freedom.

In example embodiments, the first multiple-degree-of-freedom connection may have at least four degrees of freedom that include one or more of roll, pitch, and yaw.

In example embodiments, the first multiple-degree-of-freedom connection may have at least four degrees of freedom that include two or more of roll, pitch, and yaw.

In example embodiments, the first multiple-degree-of-freedom connection may have at least four degrees of freedom that include roll, pitch, and yaw.

In example embodiments, the first multiple-degree-of-freedom connection may have at least two degrees of freedom and/or the second multiple-degree-of-freedom connection may have at least two degrees of freedom.

In example embodiments, the first multiple-degree-of-freedom connection may have at least three degrees of freedom, and/or the second multiple-degree-of-freedom connection may have at least three degrees of freedom.

In example embodiments, the first multiple-degree-of-freedom connection may have at least four degrees of freedom, and/or the second multiple-degree-of-freedom connection may have at least four degrees of freedom.

In example embodiments, a mechanical connection between adjacent components of a system may include a first component of the system, a second component of the system, and/or a multiple-degree-of-freedom connection between the first component and the second component. The multiple-degree-of-freedom connection may have at least four degrees of freedom.

In example embodiments, the multiple-degree-of-freedom connection may include a post connected to the first component. The post may fit into a guide in the second component to form the multiple-degree-of-freedom connection.

In example embodiments, the post may include a proximal end, a middle portion, and/or a distal end. The proximal end may be wider than the middle portion. The distal end may be wider than the middle portion.

In example embodiments, the proximal end may include first, second, and/or third surfaces. The distal end may include fourth, fifth, and/or sixth surfaces. The first and the fifth surfaces may be disposed at opposite ends of the post. The second and fourth surfaces may be disposed at opposite ends of the middle portion.

In example embodiments, the third surface may be disposed at a widest part of the proximal end. The sixth surface may be disposed at a widest part of the distal end. The third surface may include lands and grooves to support the mechanical connection.

In example embodiments, the fourth surface may be spherical.

In example embodiments, the fifth surface may be conical.

In example embodiments, a method for establishing a mechanical connection between adjacent components of a system may include disposing a first component of the system adjacent to a second component of the system, and/or connecting the first component to the second component using a multiple-degree-of-freedom connection. The multiple-degree-of-freedom connection may have at least four degrees of freedom.

These and other features and advantages of this invention are described in, or are apparent from, the following detailed description of various example embodiments of the apparatuses and methods according to the invention.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF EXAMPLE EMBODIMENTS

Figure 1:
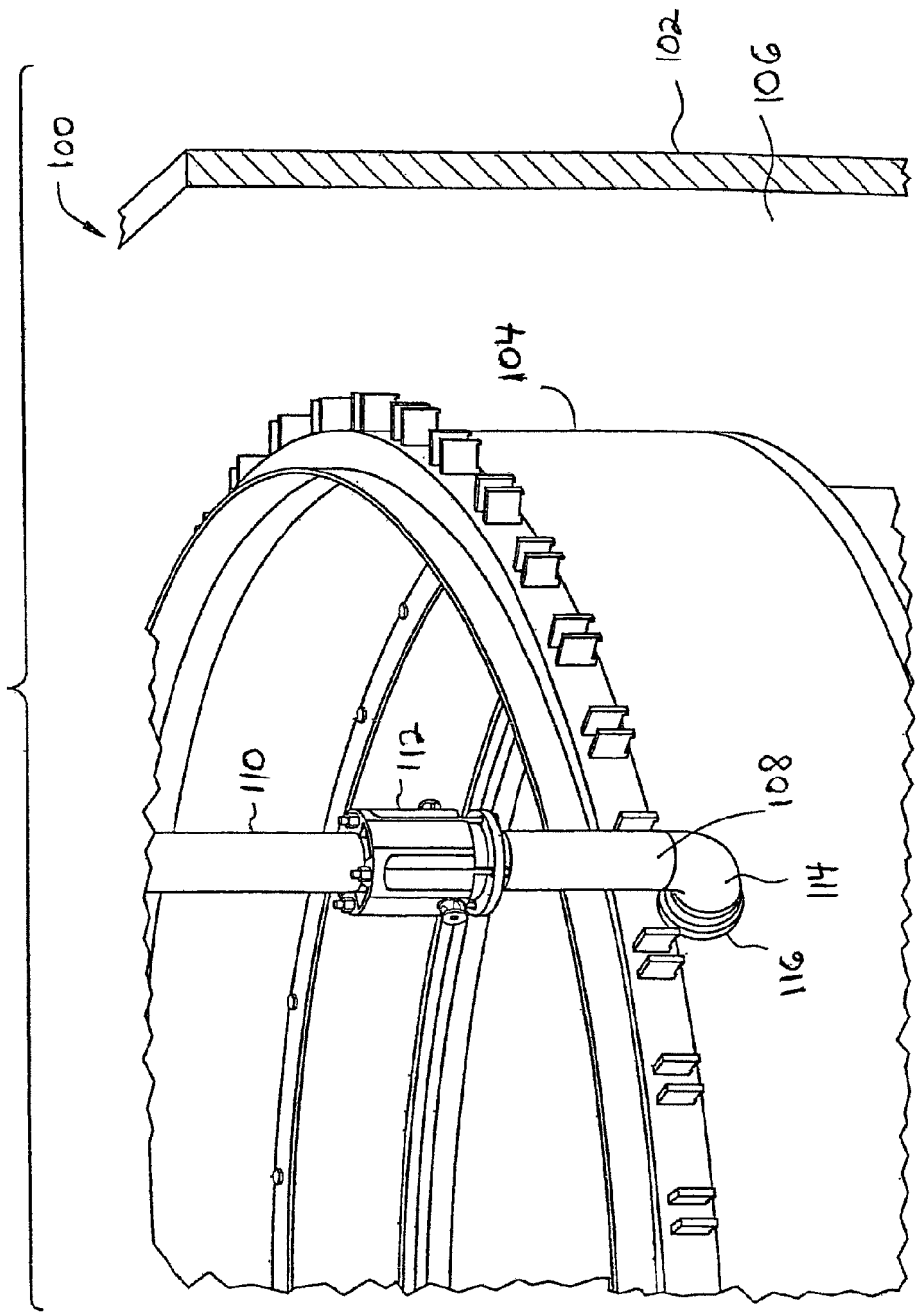
FIG. 1 is an isometric, partial cross-sectional view, with parts cut away, of a related art RPV of a BWR.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is an isometric, partial cross-sectional view, with parts cut away, of a related art RPV of a BWR. FIG. 1 illustrates a shroud showing the spatial arrangement of downcomer piping and a lower sectional replacement that encompasses a coupling and replacement piping elbow. As discussed above, the coupling apparatus also may be used in the event of full piping replacement.

RPV 100 may include vessel wall 102 and/or shroud 104 that surrounds the reactor core (not shown) of RPV 100. Annulus 106 may be formed between vessel wall 102 and shroud 104. The space inside annulus 106 may be limited, as most reactor support piping may be located within annulus 106.

In the event of a reactor plant casualty, such as a LOCA, cooling water may be delivered to the reactor core through a core spray distribution header. The core spray distribution header may include a horizontal section (not shown) and/or a vertical section commonly referred to as downcomer pipe 108. A portion of downcomer pipe 108, which is in close proximity to shroud 104, may be removed, leaving a remnant 110 of the vertical downcomer piping. Connected between remnant 110 and a lower sectional replacement ("LSR") pipe may be coupling apparatus 112. Coupling apparatus 112 may allow replacement of a lower portion of downcomer pipe 108, if needed, and/or may avoid the use of field welding. Downcomer pipe 108 may include lower elbow 114 which, in turn, may be connected to shroud 104 via elbow flange 116.

As discussed below, downcomer pipe 108 may direct coolant to a sparger T-box that may be attached to a lower sparger pipe and/or an upper sparger pipe. If a sparger T-box is attached to a lower sparger pipe, for example, a similar sparger T-box at another shroud location may be attached to an upper sparger pipe.

Figure 2:
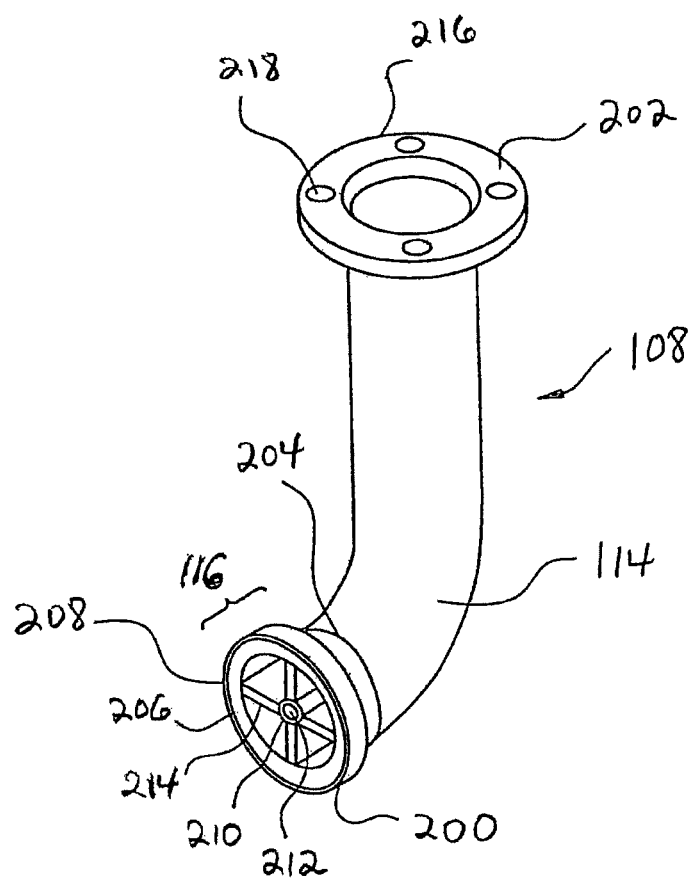
FIG. 2 is a detailed isometric view of a related art downcomer pipe coupling of the related art.

FIG. 2 is a detailed isometric view of a related art downcomer pipe coupling. As shown in FIG. 2, replacement downcomer pipe 108 may include first end 200 and/or second end 202. First end 200 may include elbow flange 116 having first end 204 and/or second end 206. First end 204 of elbow flange 116 may be configured to couple to replacement downcomer pipe 108 by any suitable means (e.g., by welding). Second end 206 may include flange member 208 extending from elbow flange 116. Flange member 208 may be received into a circular groove (not shown) machined into shroud 104. The groove may be located so as to be concentric with a sparger T-box that penetrates through shroud 104.

Center portion 210 of elbow flange 116, having axial bore 212 threaded through it, may be connected to elbow flange 116 by a plurality of vanes 214 extending from an inner surface of elbow flange 116 to center portion 210. Vanes 214 may be designed to allow adequate passage of cooling water. A draw bolt may threadedly engage axial bore 212 of center portion 210. The draw bolt may connect replacement downcomer pipe 108 to an anchor plate, legs of which may bear on an internal curved surface of shroud 104. It should be appreciated that a draw bolt may be preloaded so as to create a leak-tight joint at the connection on shroud 104. The connection may be of a tongue and groove type.

Second end 202 of replacement downcomer pipe 108 may include mating flange 216 to be connected to coupling apparatus 112, which in turn may be connected to remnant 110. Mating flange 216 may include a plurality of coupling slots 218 to receive a plurality of coupling bolts (not shown). FIG. 2 shows four coupling slots 218, but there may be more than four or fewer than four, as well. Coupling slots 218 may accommodate angular rotational misalignment between remnant 110 and replacement downcomer pipe 108.

The coupling bolts may be designed to share load and/or prevent eccentric loading. It should be appreciated that mating flange 216 may include a spherical concave seat (see FIG. 2) to receive a seal ring (not shown) for accommodating misalignment of replacement downcomer pipe 108 and mating flange 216. The concave seat and seal ring in mating flange 216 may allow angular articulation, along the vertical axis, between remnant 110 and replacement downcomer pipe 108.

Figure 3:
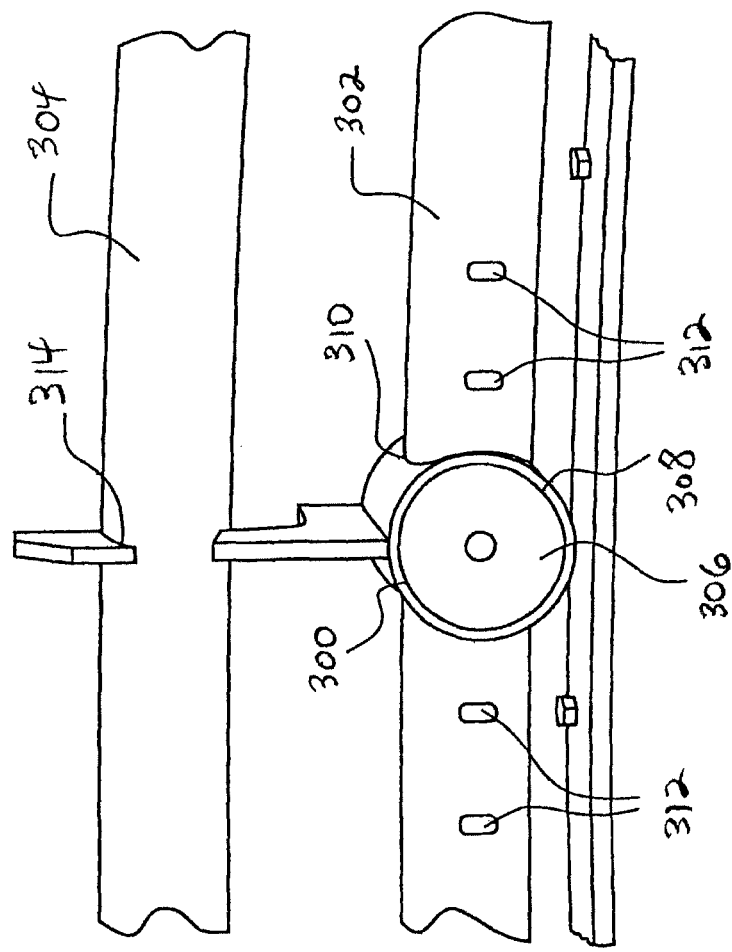
FIG. 3 is an isometric view of a portion of a related art T-box assembly viewed from the inside of the RPV.

FIG. 3 is an isometric view of a portion of a related art T-box assembly viewed from the inside of RPV 100. The core spray system may supply water to the reactor core region through sparger T-box 300, which may penetrate through shroud 104. Sparger T-box 300 may be a junction where the core spray downcomer supply flowstream is directed to lower sparger pipe 302 and/or upper sparger pipe 304. For example, downcomer pipe 108 may direct coolant to sparger T-box 300, which may be attached to lower sparger pipe 302 and/or upper sparger pipe 304. FIG. 3 shows sparger T-box 300 attached to lower sparger pipe 302. At another shroud location, a similar sparger T-box 300 may be attached to upper sparger pipe 304.

As shown in FIG. 3, sparger T-box 300 may be part of a section of lower sparger pipe 302 that may be capped by flat plate 306, welded at location 308 to an end of lower sparger pipe 302. Further, lower sparger pipe 302 may be welded at location 310 on sparger T-box 300 to form a piping tee.

However, vibration fatigue and/or weld cracking due to IGSCC, for example, may cause weld failure at location 308 and/or weld failure at location 310, joining lower sparger pipe 302 to sparger T-box 300. In the event that through-wall circumferential cracking should occur in the weld at location 308 and/or in the weld at location 310, the core spray system may provide unpredictable leakage of fluid and/or fail to deliver the necessary volumetric flow rate to the reactor core.

Further, as shown in FIG. 3, lower sparger pipe 302 may include vertical slots 312 to receive associated T-bolts. In general, the operation of the T-bolts in vertical slots 312 may ensure a T-box clamp with a structural connection capable of creating a tight seal against lower sparger pipe 302. In other words, the operation of the associated T-bolts in vertical slots 312 may help maintain the position of lower sparger pipe 302 and/or upper sparger pipe 304 in relation to sparger T-box 300 should one or more welds fail. Lower sparger pipe 302 and/or upper sparger pipe 304 also may receive support from one or more brackets 314.

Vertical slots 312 may be machined into lower sparger pipe 302 by any suitable method, for example, electrical discharge machining ("EDM"). Accordingly, vertical slots 312 machined in lower sparger pipe 302 may be provided to receive the distal ends of associated T-bolts. As discussed below, the associated T-bolts may be oriented vertically and thus allowed to pass through vertical slots 312 of lower sparger pipe 302. As the associated T-bolts are rotated 90 degrees by the action of rotating an associated T-bolt nut, the "T" at the distal end of the associated T-bolts may assume a horizontal orientation and come to bear against the inner surface of lower sparger pipe 302.

Figure 4:
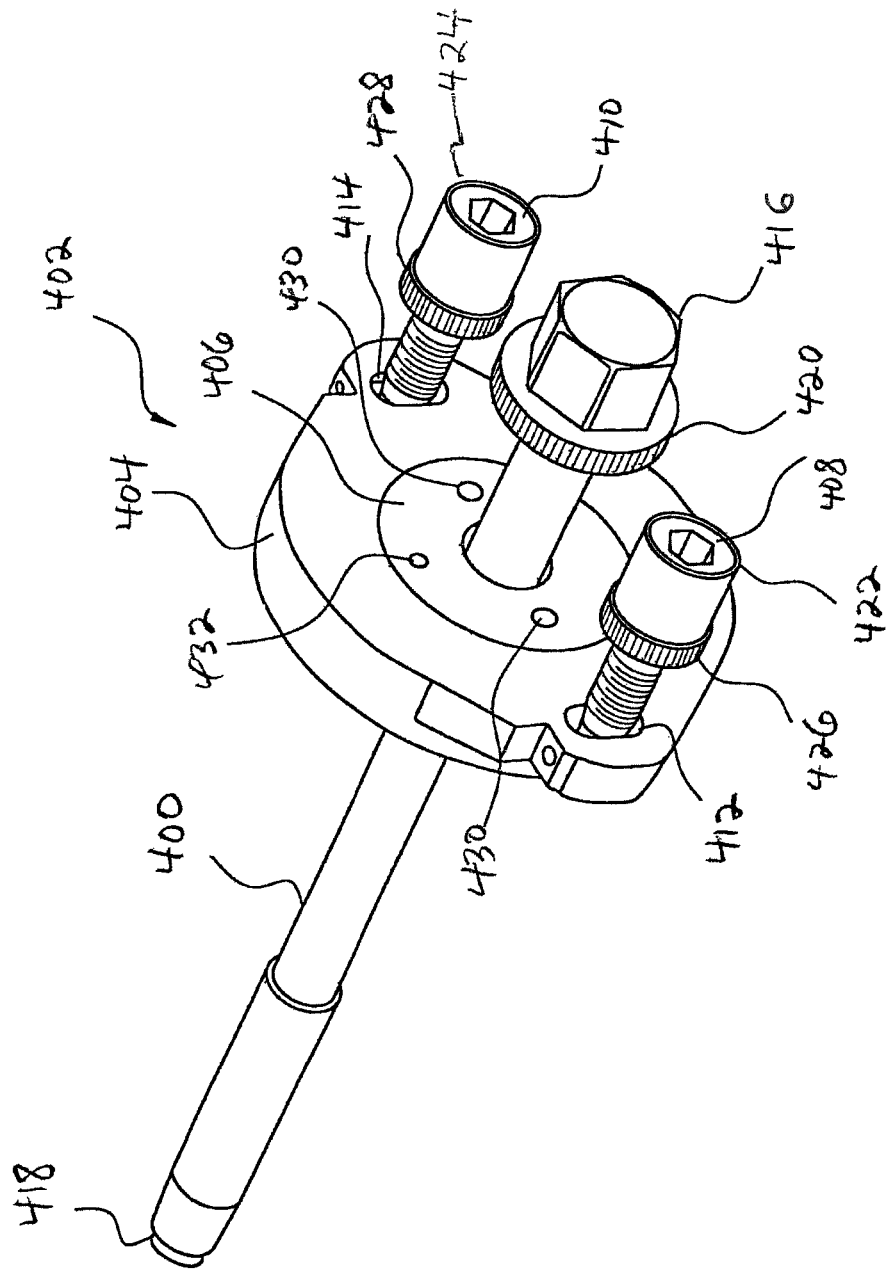
FIG. 4 is a detailed isometric view of a related art seal plate assembly.
Figure 5:
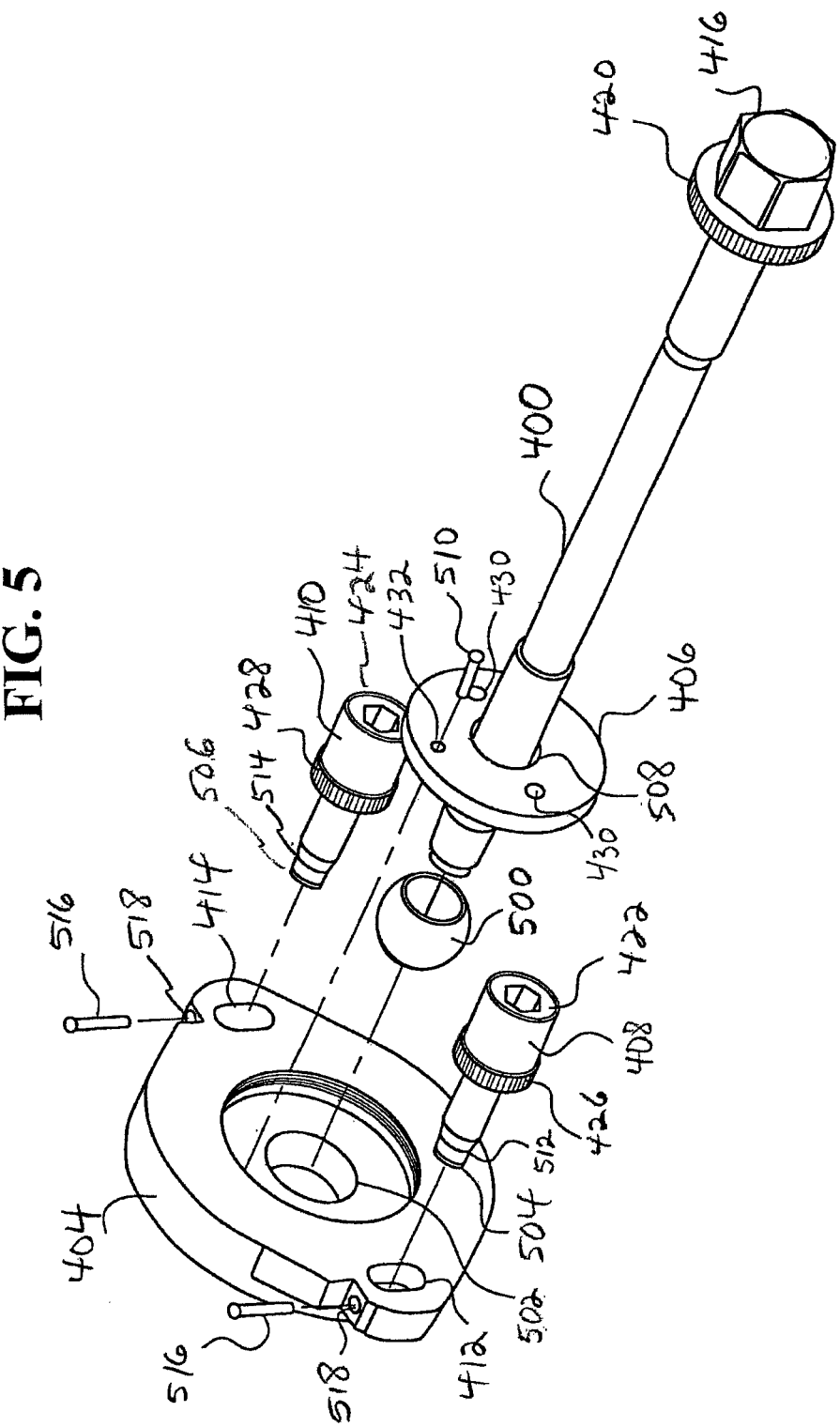
FIG. 5 is an exploded view of the related art seal plate assembly of FIG. 4.

FIG. 4 is a detailed isometric view of a related art seal plate assembly. FIG. 5 is an exploded view of the related art seal plate assembly of FIG. 4.

Referring to FIGS. 4 and 5, seal plate assembly 402 may include seal plate 404, seal plate cover 406, draw bolt 400, seal plate bolts 408 and 410, and/or swivel sleeve 500. Seal plate 404 may include seal plate bolt openings 412 and 414, and/or bolt opening 502. Draw bolt 400 may include proximal end 416 and distal end 418. Ratchet teeth 420 may be machined into the periphery of proximal end 416 of draw bolt 400. Ratchet teeth 420 may be equally spaced. Seal plate bolt 408 may include proximal end 422 and distal end 504. Ratchet teeth 426 may be machined into the periphery of proximal end 422 of seal plate bolt 408. Ratchet teeth 426 may be equally spaced. Seal plate bolt 410 may include proximal end 424 and distal end 506. Ratchet teeth 428 may be machined into the periphery of proximal end 424 of seal plate bolt 410. Ratchet teeth 428 may be equally spaced.

Seal plate cover 406 may include central opening 508 to receive draw bolt 400. Seal plate cover 406 also may include one or more openings 430 and/or one or more openings 432 around central opening 508. One or more openings 430 may accept a tool (e.g., spanner wrench) for installation and/or tightening of seal plate cover 406. One or more openings 432 may receive dowel pin 510 to secure seal plate cover 406 to seal plate 404 and prevent seal plate cover 406 from rotating.

Distal end 504 of seal plate bolt 408 may include circumferential groove 512. Distal end 506 of seal plate bolt 410 may include circumferential groove 514. Circumferential grooves 512 and 514 may be sized to receive dowel pins 516 that may be pressed into openings 518 in seal plate 404 to secure seal plate bolts 408 and 410 to seal plate 404.

Figure 6:
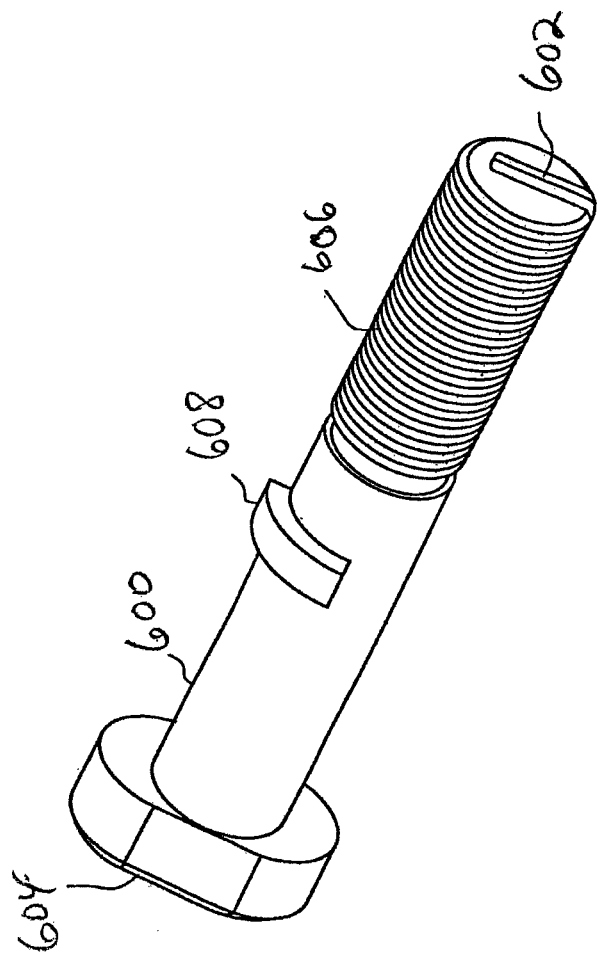
FIG. 6 is an isometric view of a related art T-bolt.

FIG. 6 is an isometric view of a related art T-bolt 600. Referring to FIG. 6, T-bolt 600 may include proximal end 602 and distal end 604. Each T-bolt 600 may include machined threaded section 606 at or near proximal end 602. T-bolt 600 also may include key 608.

Figure 7:
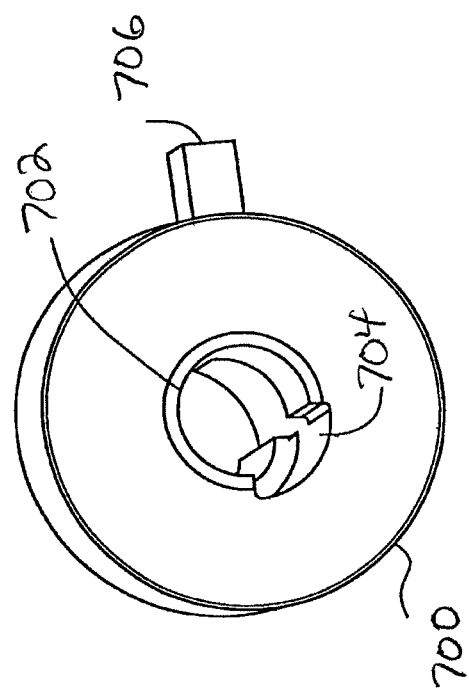
FIG. 7 is an isometric view of a related art pipe seal.

FIG. 7 is an isometric view of a related art pipe seal 700. Referring to FIG. 7, pipe seal 700 may include bore opening 702, slot 704, and/or external key 706.

Figure 8:
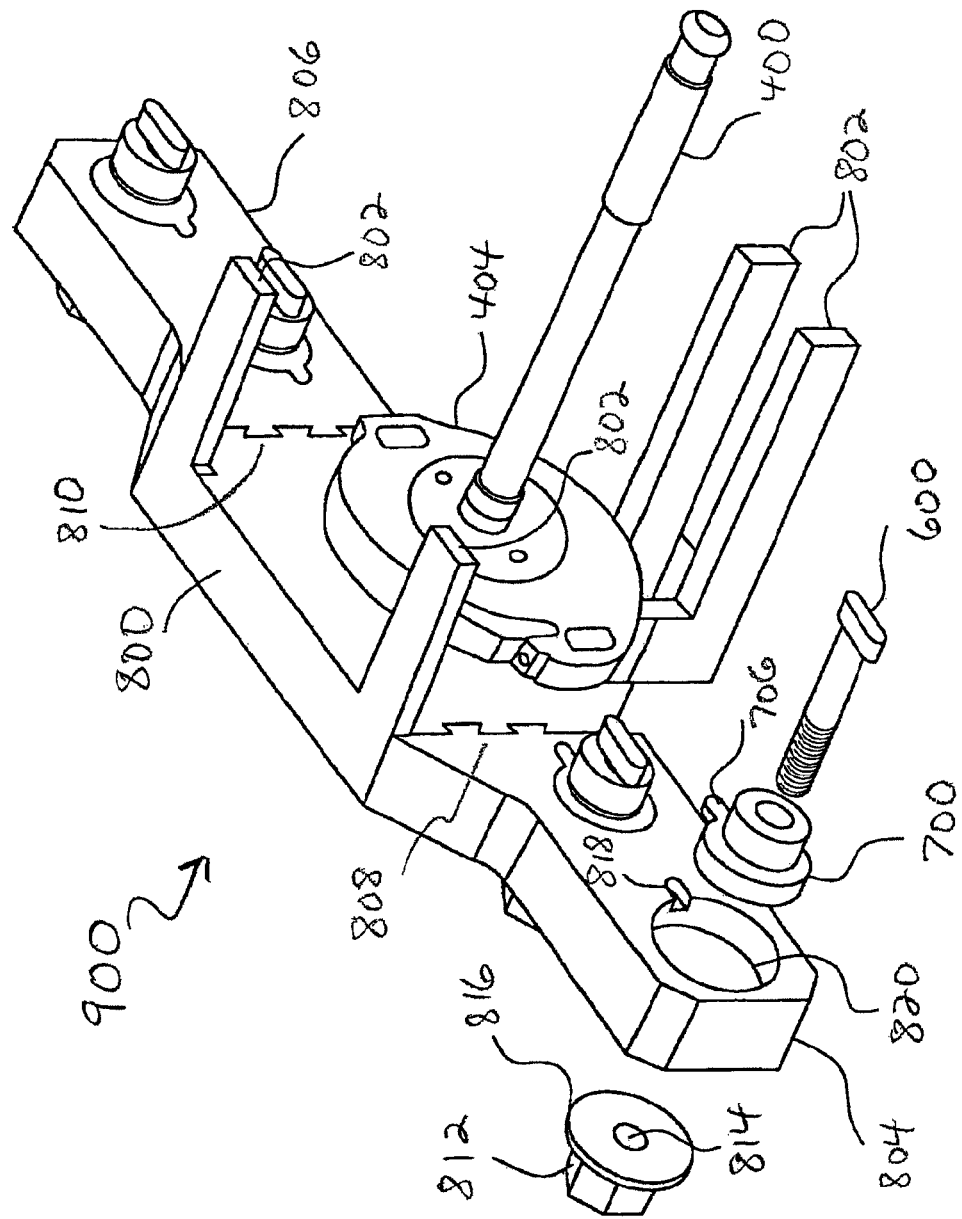
FIG. 8 is a partially exploded, perspective view of a related art sparger T-box clamp in the upper-pipe configuration.
Figure 9:
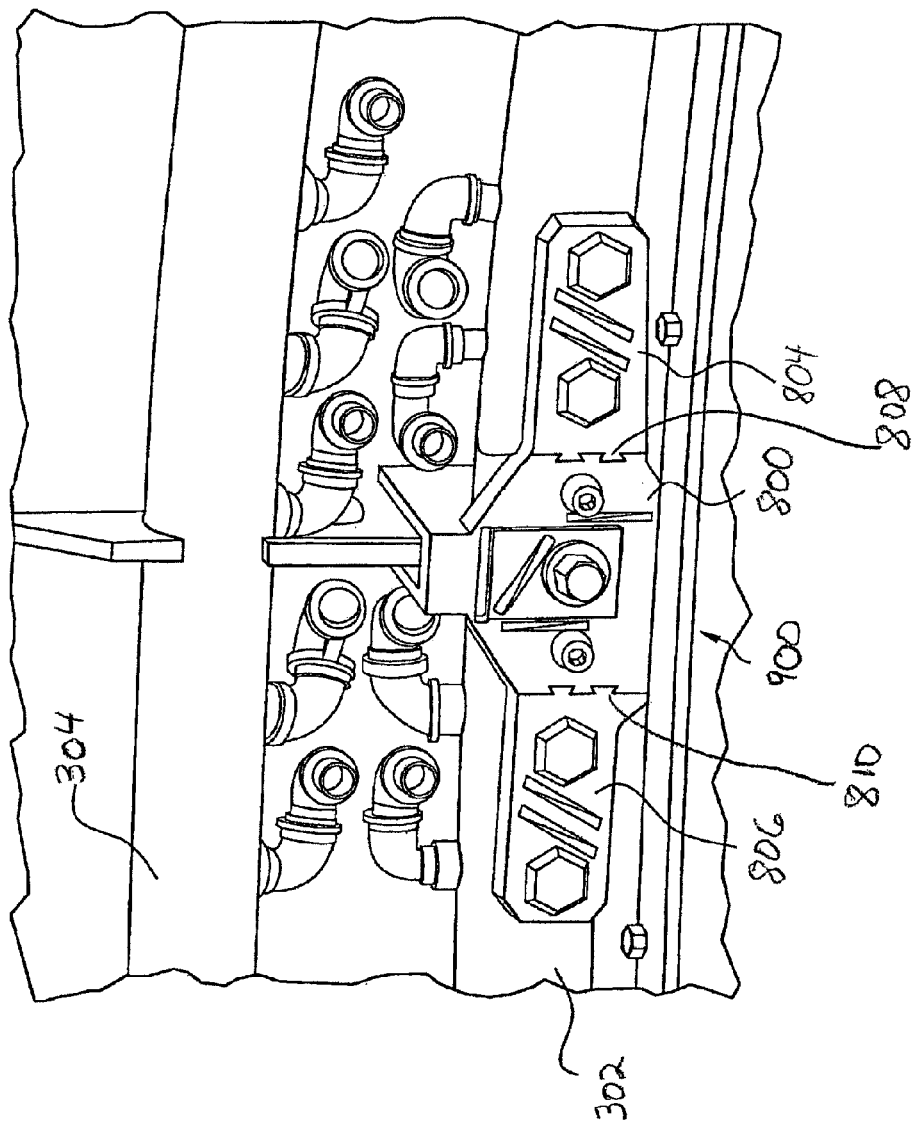
FIG. 9 is an isometric view of the related art sparger T-box clamp in the lower-pipe configuration.

FIG. 8 is a partially exploded, perspective view of a related art sparger T-box clamp 900 in the upper-pipe configuration. FIG. 9 is an isometric view of the related art sparger T-box clamp 900 in the lower-pipe configuration.

In FIGS. 8 and 9, anchor plate 800 may include plurality of legs 802 extending from a face of anchor plate 800 to provide further support. Legs 802 on anchor plate 800 may bear on an internal surface of shroud 104 and, thus, may carry preload of draw bolt 400 extending through seal plate 404 and/or transmit load from anchor plate 800 to shroud 104. Legs 802 may be configured to engage an inside surface of shroud 104. Legs 802 may be machined and/or trimmed so that anchor plate 800 is parallel to an exterior surface of sparger T-box 300. Clamp blocks 804 and 806 may be attached at ends of anchor plate 800 using dove-tail joints 808 and 810, respectively.

In FIGS. 8 and 9, clamp blocks 804 and 806 each may include T-bolts 600, T-bolt nuts 812, and/or pipe seals 700 to be assembled. It may be appreciated that T-bolts 600, T-bolt nuts 812, and/or pipe seals 700 may be pre-assembled with the respective clamp blocks 804 and 806 prior to introduction into RPV 100. Distal end 604 of T-bolts 600 may be inserted into vertical slots 312, which may be machined (e.g., EDM) into lower sparger pipe 302 and/or upper sparger pipe 304. At proximal end 602 of T-bolts 600, machined threaded section 606 may engage internal threaded section 814 of T-bolt nuts 812. Ratchet teeth 816 may be machined into the outer circumference of the head of T-bolt nuts 812. Ratchet teeth 816 may be equally spaced.

T-bolts 600 may be rotated 90 degrees and/or drawn up tight when providing a torque on T-bolt nuts 812 to bring pipe seals 700 into contact with lower sparger pipe 302 and/or upper sparger pipe 304 and, thus, seal vertical slots 312. In order to achieve minimal leakage, pipe seals 700 may be machined to match the contour of lower sparger pipe 302 and/or upper sparger pipe 304. Further, the 90 degree rotation of T-bolts 600 may be facilitated by the interfacing action of key 608 in T-bolt 600 with slot 704 in the pipe seal bore 702, and/or external key 706 on pipe seal 700 interfacing with slot 818 of T-bolt openings 820 in clamp blocks 804 and 806, as shown in FIGS. 3 and 6-8. Moreover, pipe seals 700 and T-bolt nuts 812 may include spherical seats to allow minor articulation of pipe seals 700 against lower sparger pipe 302 and/or upper sparger pipe 304.

Attaching clamp blocks 804 and 806 at ends of anchor plate 800 using dove-tail joints 808 and 810 presents several problems. First, dove-tail joint 808 provides only a single degree of freedom between clamp block 804 and anchor plate 800. Second, dove-tail joint 810 provides only a single degree of freedom between clamp block 806 and anchor plate 800. Third, because of these degree-of-freedom limitations, anchor plate 800, clamp block 804, and clamp block 806 may need to be installed as a unit to ensure proper mutual alignment. Such a need to install anchor plate 800, clamp block 804, and clamp block 806 as a unit may complicate and lengthen the installation process, leading to additional radiation exposure for operators conducting the installation and other problems. Fourth, because of these degree-of-freedom limitations, dimensions associated with the installation may need to be more precisely measured and/or anchor plate 800, clamp block 804, and/or clamp block 806 may need to be repeatedly machined so that they may be installed with proper mutual alignment.

In FIGS. 8 and 9, taking anchor plate 800 as stationary—and assuming a three-dimensional Cartesian coordinate system with its origin at dove-tail joint 808, the +x direction being approximately to the right in FIG. 9 along the body of clamp block 804, the +y direction being approximately into the page in FIG. 9, and the +z direction being approximately up the page in FIG. 9—the single degree-of-freedom connection between anchor plate 800 and clamp block 804 provided by dove-tail joint 808 is in the ±y direction. This single degree-of-freedom connection does not allow relative movement between anchor plate 800 and clamp block 804 in the ±x direction, in the ±z direction, in roll, in pitch, or in yaw.

Similarly, taking anchor plate 800 as stationary—and assuming a three-dimensional Cartesian coordinate system with its origin at dove-tail joint 810, the +x direction being approximately to the right in FIG. 9 along the body of anchor plate 800, the +y direction being approximately into the page in FIG. 9, and the +z direction being approximately up the page in FIG. 9—the single degree-of-freedom connection between anchor plate 800 and clamp block 806 provided by dove-tail joint 810 is in the ±y direction. This single degree-of-freedom connection does not allow relative movement between anchor plate 800 and clamp block 806 in the ±x direction, in the ±z direction, in roll, in pitch, or in yaw.

Figure 10:
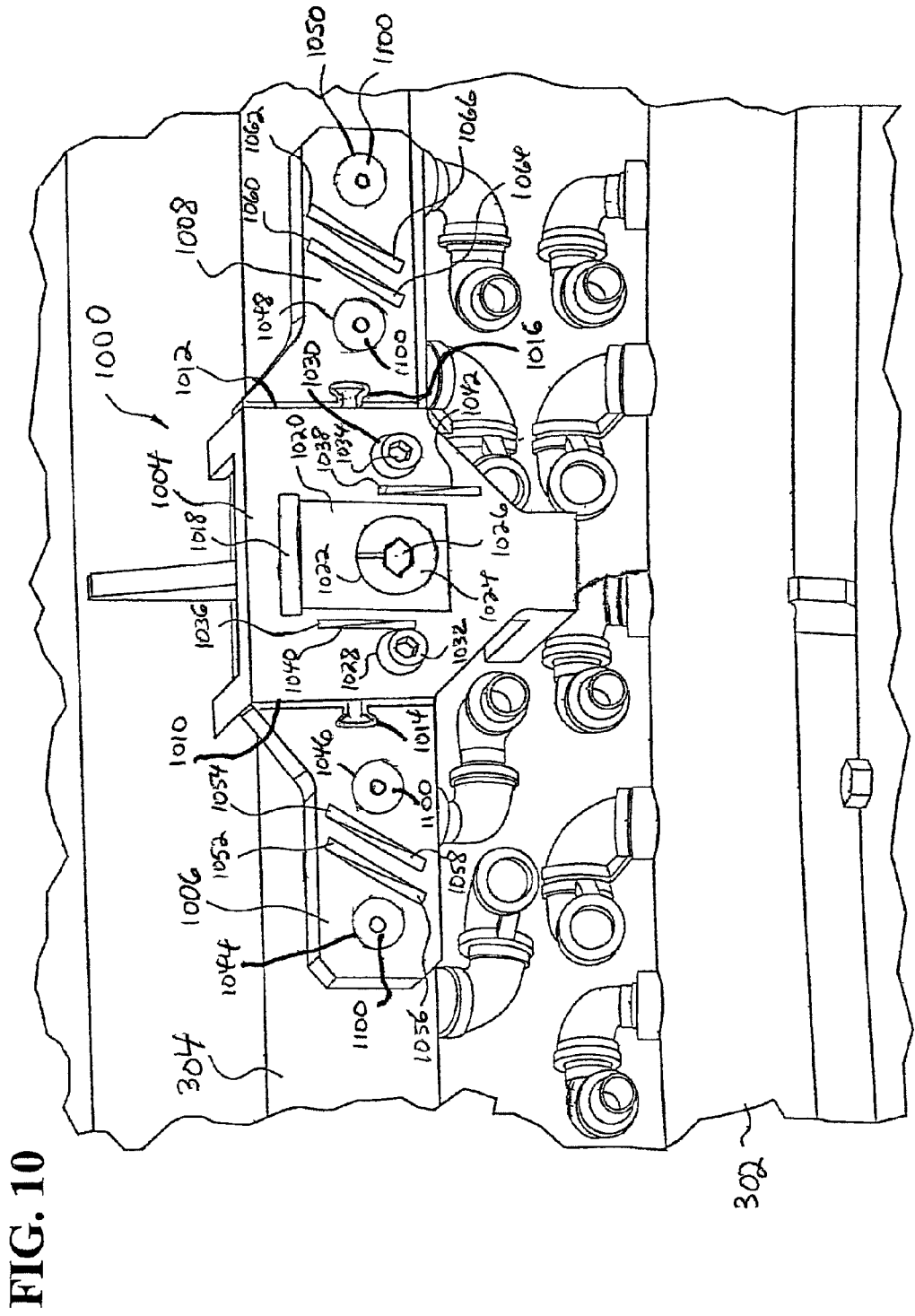
FIG. 10 is an isometric view of a sparger T-box clamp in the upper-pipe configuration according to example embodiments.
Figure 11:
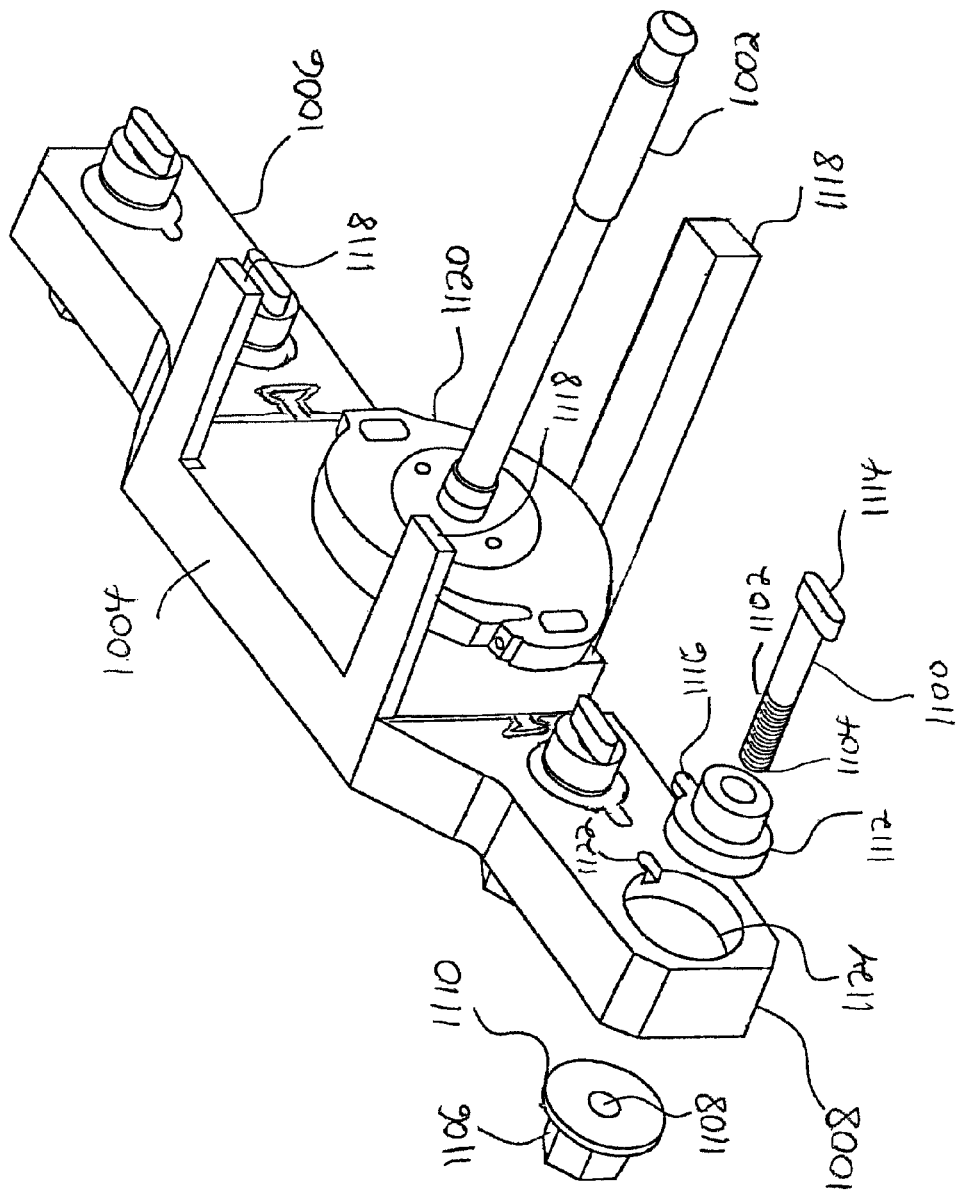
FIG. 11 is a partially exploded view of a sparger T-box clamp according to embodiments.

FIG. 10 is an isometric view of a sparger T-box clamp in the upper-pipe configuration according to example embodiments. FIG. 11 is a partially exploded view of a sparger T-box clamp according to example embodiments.

Sparger T-box clamp 1000 may provide: 1) a restraining structure for draw bolt 1002, which may pass through clearance hole in sparger T-box cover plate 306; and 2) a restraining structure for lower sparger pipe 302 and/or upper sparger pipe 304 to limit movement of these pipes relative to the position of the sparger T-box 300 in the event that welds crack circumferentially.

In FIG. 10, sparger T-box clamp 1000 may include anchor plate 1004, first clamp block 1006, and/or second clamp block 1008. Anchor plate 1004 may be positioned central to sparger T-box clamp 1000 with first clamp block 1006 and second clamp block 1008 connected to opposite sides 1010 and 1012, respectively, of anchor plate 1004. First clamp block 1006 and second clamp block 1008 may be positioned to be substantially aligned with one another. Specifically, first clamp block 1006 and second clamp block 1008 may be connected to opposite sides 1010 and 1012 of anchor plate 1004 with multiple degree-of-freedom connections 1014 and 1016, respectively, discussed in more detail below. Multiple degree-of-freedom connections 1014 and 1016 may permit first clamp block 1006 and/or second clamp block 1008 to move relative to anchor plate 1004. Such movement may reduce or eliminate the imposition of stress on upper sparger pipe 304 and/or associated welds (similarly, for sparger T-box clamp 1000 in the lower-pipe configuration, such movement may reduce or eliminate the imposition of stress on lower sparger pipe 302, the weld at location 308, and/or the weld at location 310).

In FIG. 10, anchor plate 1004 may include a substantially large recessed cavity 1018 to accommodate adjustable plate 1020. Adjustable plate 1020 may provide a bearing surface for draw bolt 1002 and/or permit adjustments for draw bolt 1002 to receive central portion of sparger T-box 300. Adjustable plate 1020 may move in the vertical direction because recessed cavity 1018 may be relatively larger than adjustable plate 1020. Adjustable plate 1020 may include draw bolt opening 1022 to receive draw bolt 1002 and/or crimp collar 1024 around draw bolt 1002.

Draw bolt 1002 may have a cylindrical head and/or a hexagonal socket 1026 for tightening. If a ratchet lock arrangement is to be used, ratchet teeth (not shown) on draw bolt 1002 may be oriented such that rotation is permitted in only one direction.

Crimp collar 1024 may be located under and/or surrounding the head of draw bolt 1002. Crimp collar 1024 may have a first spherical surface that may interface with a second spherical surface on adjustable plate 1020. This interfacing may allow draw bolt 1002 to remain in-line with elbow flange 116 and/or axial bore 212 while anchor plate 1004 adjusts to the inner surface of shroud 104, as needed, in terms of roll, pitch, and/or yaw. Crimping of crimp collar 1024 after the application of preload on draw bolt 1002 may prevent rotation of draw bolt 1002 so that draw bolt 1002 may be removed only after crimp collar 1024 is removed or defeated.

In FIGS. 10 and 11, anchor plate 1004 may include openings 1028 and 1030 to receive seal plate bolts 1032 and 1034. Openings 1028 and 1030 may be threaded to receive seal plate bolts 1032 and 1034. Anchor plate 1004 may further include machined slots 1036 and 1038 to accommodate latch springs 1040 and 1042, respectively. Latch springs 1040 and 1042 may reside in slots 1036 and 1038. Latch springs 1040 and 1042 may interface with seal plate bolts 1032 and 1034, respectively. Seal plate bolts 1032 and 1034 may include equally spaced ratchet teeth (not shown) that may be machined into the periphery of the heads of seal plate bolts 1032 and 1034. The ratchet teeth of seal plate bolt 1032 may engage teeth of latch spring 1040 to lock seal plate bolt 1032 in position and/or to prevent seal plate bolt 1032 from rotating. Similarly, the ratchet teeth of seal plate bolt 1034 may engage teeth of latch spring 1042 to lock seal plate bolt 1034 in position and/or to prevent seal plate bolt 1034 from rotating. The rotation of seal plate bolts 1032 and 1034 may be performed with a hexagonal wrench that accommodates an internal hexagon slot in the head of seal plate bolts 1032 and 1034. The load produced by the rotation may advance seal plate 1120 against the respective sparger T-box cover plate (e.g., in the lower-pipe configuration, sparger T-box cover plate 306).

First clamp block 1006 and second clamp block 1008 may be attached to anchor plate 1004 at opposite sides 1010 and 1012. First clamp block 1006 may include T-bolt openings 1044 and 1046 extending through first clamp block 1006. Second clamp block 1008 may include T-bolt openings 1048 and 1050 extending through second clamp block 1008.

In FIG. 11, T-bolts 1100 may extend through each of T-bolt openings 1044, 1046, 1048, and 1050. Each T-bolt 1100 may include a machined threaded section 1102 on proximal end 1104 of T-bolt 1100 so as to engage with internal threaded section 1108 of T-bolt nut 1106.

T-bolt nuts 1106 may preferably be threaded with an internal tap of 5/8 18 Unified Thread Standard, fine series ("UNF"), for example. However, a person of ordinary skill in the art ("PHOSITA") would understand that various tap dimensions may be used.

First clamp block 1006 may include machined slots 1052 and 1054 to accommodate latch springs 1056 and 1058, respectively. Second clamp block 1008 may include machined slots 1060 and 1062 to accommodate latch springs 1064 and 1066, respectively. Each latch spring 1056, 1058, 1064, and 1066 may include ratchet teeth (not shown) to engage with respective T-bolt nuts 1106.

In FIG. 11, ratchet teeth 1110 may be machined into the outer circumference of the head of T-bolt nuts 1106. Ratchet teeth 1110 may be equally spaced. Ratchet teeth 1110 may engage with latch springs 1056 and 1058 in first clamp block 1006 and/or latch springs 1064 and 1066 in second clamp block 1008. Latch springs 1056, 1058, 1064, and 1066 may lock respective T-bolt nuts 1106 and/or allow rotation in only one direction, which may increase preload in T-bolts 1100.

An anti-rotation feature of T-bolts 1100 may be accomplished by the feature of a key on T-bolts 1100 (similar to key 608 on T-bolts 600) that may interface with a slot of pipe seal 1112 (similar to slot 704 of pipe seal 700) integral with a bore opening of pipe seal 1112 (similar to bore opening 702 of pipe seal 700). The slot of pipe seal 1112 may be designed to permit only 90 degrees rotation of T-bolt 1100. As T-bolt nut 1106 is rotated, the key of T-bolt 1100 may advance through the distal end (surface adjacent to lower sparger pipe 302 or upper sparger pipe 304) of pipe seal 1112. As a result, the key may reach the middle or intermediate section of the bore opening, at which point friction in the interfacing threaded section 1102 of T-bolt 1100 and with internal threaded section 1108 of T-bolt nut 1106 may cause T-bolt 1100 to rotate 90 degrees. This action may orient distal "T" end 1114 of T-bolt 1100 horizontally.

As rotation of T-bolt nut 1106 is continued, the key may be drawn into the proximal section of the bore opening. The proximal section of the bore opening, in addition with external key 1116 of pipe seal 1112 interfacing with slot 1122 of T-bolt openings 1124 of clamp block 1008, for example, may lock T-bolt 1100 in the desired orientation. Accordingly, rotation of T-bolt nut 1106 may advance distal "T" end 1114 of T-bolt 1100 to come to bear against the internal surface of lower sparger pipe 302 or upper sparger pipe 304 and, thus, pull the surface (that may be contoured) of pipe seal 1112 into full contact with the external surface of lower sparger pipe 302 or upper sparger pipe 304 and, thus, seal the remainder of vertical slots 312 in lower sparger pipe 302 or upper sparger pipe 304.

In FIG. 11, slots 1122 may assume any orientation. Each slot 1122 may assume the same orientation or one or more slots 1122 may assume different orientations from each other. For example, slots 1122 may face away from draw bolt 1002, may face toward draw bolt 1002, or may both face away and face toward draw bolt 1002. In another example, slots 1122 may be oriented vertically, horizontally, diagonally, or a mixture thereof.

Figure 12:
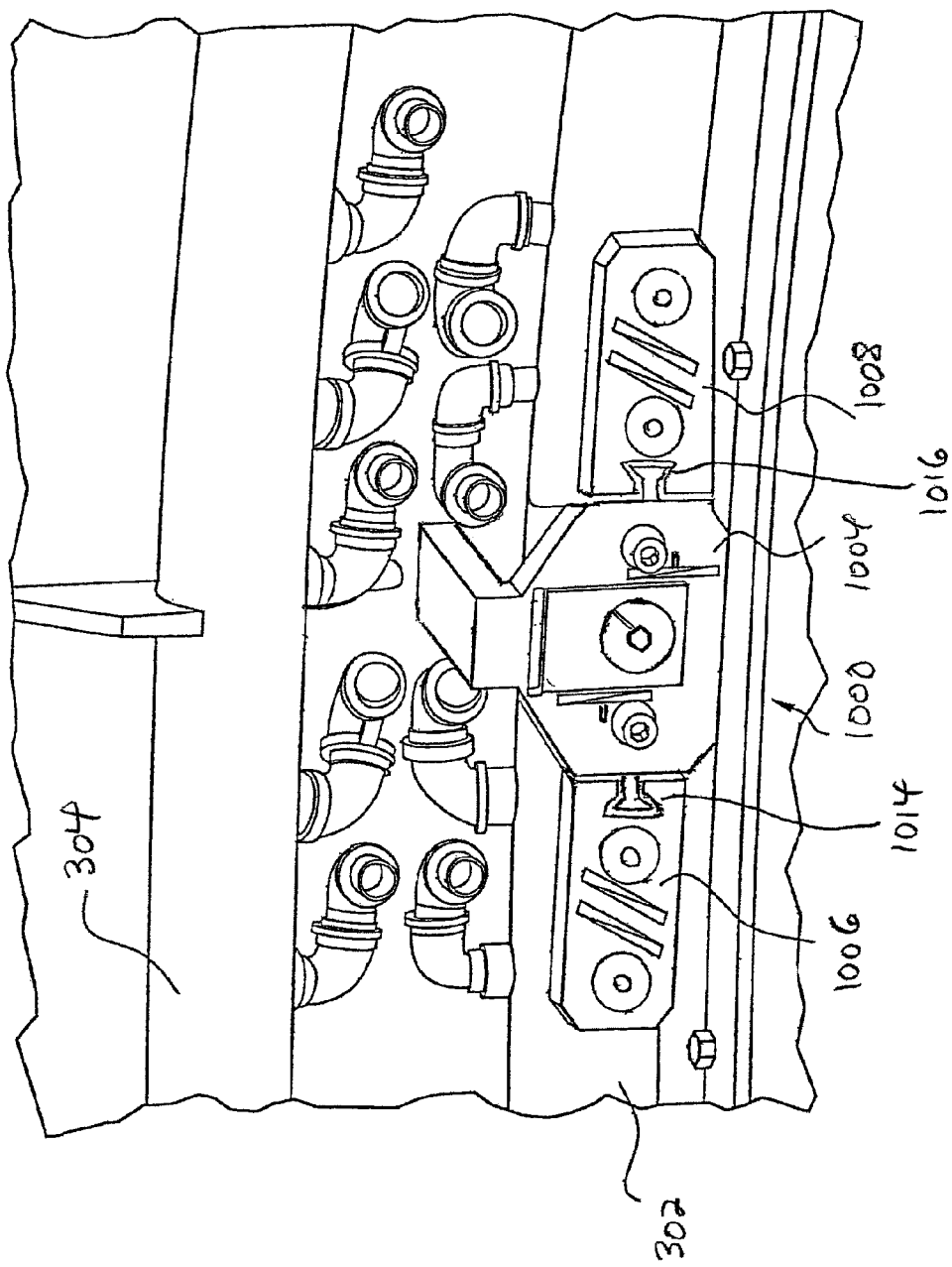
FIG. 12 is an isometric view of a sparger T-box clamp in the lower-pipe configuration according to example embodiments.

FIG. 12 is an isometric view of sparger T-box clamp 1000 in the lower-pipe configuration according to example embodiments.

In FIGS. 10-12, anchor plate 1004 may include plurality of legs 1118 extending from a face of anchor plate 1004 to provide further support. Legs 1118 on anchor plate 1004 may bear on an internal surface of shroud 104 and, thus, may carry preload of draw bolt 1002 extending through seal plate 1120 and/or transmit load from anchor plate 1004 to shroud 104. Legs 1118 may be configured to engage an inside surface of shroud 104.

For related art sparger T-box clamp 900, where anchor plate 800 is connected to clamp block 804 using dove-tail joint 808 and also connected to clamp block 806 using dove-tail joint 810, the single degree-of-freedom connections result in the faces of anchor plate 800, clamp block 804, and clamp block 806 being parallel. In contrast, for sparger T-box clamp 1000, where anchor plate 1004 is connected to first clamp block 1006 using multiple degree-of-freedom connection 1014 and also connected to second clamp block 1008 using multiple degree-of-freedom connection 1016, the multiple degree-of-freedom connections do not require that the face of anchor plate 1004 be parallel to the face of either first clamp block 1006 or second clamp block 1008, nor do the multiple degree-of-freedom connections require that the face of first clamp block 1006 be parallel to the face of second clamp block 1008. Thus, multiple degree-of-freedom connections 1014 and 1016 may permit first clamp block 1006 and/or second clamp block 1008 to move relative to anchor plate 1004.

In FIGS. 10-12, taking anchor plate 1004 as stationary—and assuming a three-dimensional Cartesian coordinate system with its origin at multiple degree-of-freedom connection 1016, the +x direction being approximately to the right in FIG. 12 along the body of second clamp block 1008, the +y direction being approximately into the page in FIG. 12, and the +z direction being approximately up the page in FIG. 12—the multiple degree-of-freedom connection between anchor plate 1004 and second clamp block 1008 provided by multiple degree-of-freedom connection 1016 may be in the ±y direction, in roll, in pitch, or in yaw. This multiple degree-of-freedom connection does not allow relative movement between anchor plate 1004 and second clamp block 1008 in the ±x direction or in the ±z direction.

Similarly, taking anchor plate 1004 as stationary—and assuming a three-dimensional Cartesian coordinate system with its origin at multiple degree-of-freedom connection 1014, the +x direction being approximately to the right in FIG. 12 along the body of anchor plate 1004, the +y direction being approximately into the page in FIG. 12, and the +z direction being approximately up the page in FIG. 12—the multiple degree-of-freedom connection between first clamp block 1006 and anchor plate 1004 provided by multiple degree-of-freedom connection 1014 may be in the ±y direction, in roll, in pitch, or in yaw. This multiple degree-of-freedom connection does not allow relative movement between first clamp block 1006 and anchor plate 1004 in the ±x direction or in the ±z direction.

Multiple degree-of-freedom connection 1014 and/or multiple degree-of-freedom connection 1016 may have at least two degrees of freedom. The at least two degrees of freedom may include one or more of roll, pitch, and yaw. The at least two degrees of freedom may include two or more of roll, pitch, and yaw.

Multiple degree-of-freedom connection 1014 and/or multiple degree-of-freedom connection 1016 may have at least three degrees of freedom. The at least three degrees of freedom may include one or more of roll, pitch, and yaw. The at least three degrees of freedom may include two or more of roll, pitch, and yaw. The at least three degrees of freedom may include roll, pitch, and yaw.

Multiple degree-of-freedom connection 1014 and/or multiple degree-of-freedom connection 1016 may have at least four degrees of freedom. The at least four degrees of freedom may include one or more of roll, pitch, and yaw. The at least four degrees of freedom may include two or more of roll, pitch, and yaw. The at least four degrees of freedom may include roll, pitch, and yaw.

As shown in FIGS. 10-12, multiple degree-of-freedom connection 1014 may include a post connected to anchor plate 1004 and a corresponding guide in first clamp block 1006. In the alternative, multiple degree-of-freedom connection 1014 may include a post connected to first clamp block 1006 and a corresponding guide in anchor plate 1004. As also shown in FIGS. 10-12, multiple degree-of-freedom connection 1016 may include a post connected to anchor plate 1004 and a corresponding guide in second clamp block 1008. In the alternative, multiple degree-of-freedom connection 1016 may include a post connected to second clamp block 1008 and a corresponding guide in anchor plate 1004.

Figure 13:
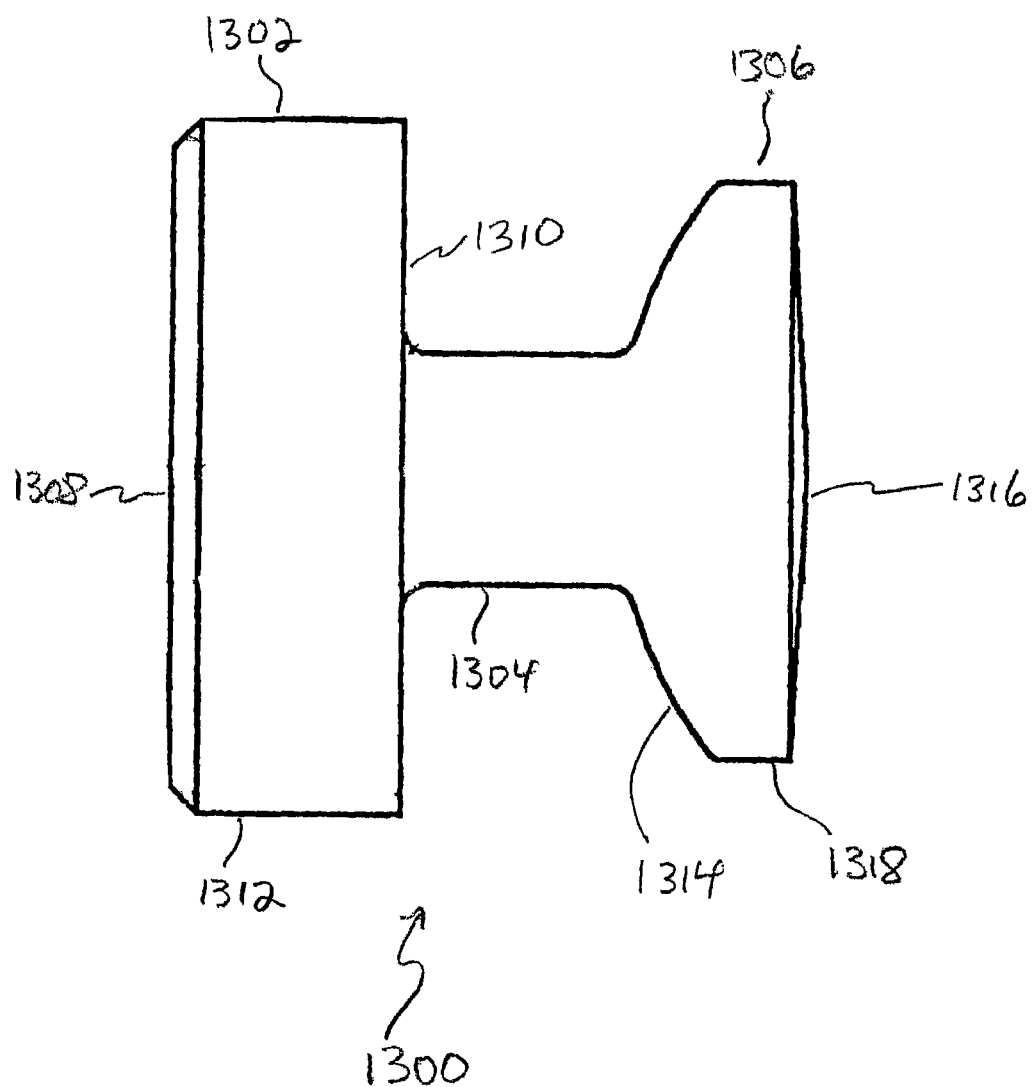
FIG. 13 is a side view of a post according to example embodiments.

FIG. 13 is a side view of post 1300 according to example embodiments.

Post 1300 may include proximal end 1302, middle portion 1304, and/or distal end 1306. Proximal end 1302 may be wider than middle portion 1304. Distal end 1306 may be wider than middle portion 1304.

Proximal end 1302 may include first surface 1308, second surface 1310, and/or third surface 1312. Distal end 1306 may include fourth surface 1314, fifth surface 1316, and/or sixth surface 1318. First surface 1308 and fifth surface 1316 may be disposed at opposite ends of post 1300. Second surface 1310 and fourth surface 1314 may be disposed at opposite ends of middle portion 1304.

Third surface 1312 may be disposed at a widest part of proximal end 1302. Sixth surface 1318 may be disposed at a widest part of distal end 1306. Third surface 1312 may include lands and/or grooves to support mechanical connection to anchor plate 1004, first clamp block 1006, and/or second clamp block 1008.

Fourth surface 1314 may be spherical. Fourth surface 1314 may interface with a corresponding cylindrical surface in a corresponding guide. This interfacing may accommodate movement in one or more of the multiple degrees of freedom.

Fifth surface 1316 may be conical.

For ease of machining and/or other purposes, post 1300 may be made separately from anchor plate 1004 and then connected to anchor plate 1004 by, for example, a pinned or threaded connection. However, post 1300 also may be made as a one-piece unit together with anchor plate 1004.

Similarly, post 1300 may be made separately from first clamp block 1006 and/or second clamp block 1008 and then connected to first clamp block 1006 and/or second clamp block 1008 by, for example, a pinned or threaded connection. However, post 1300 also may be made as a one-piece unit together with first clamp block 1006 and/or second clamp block 1008.

The guide corresponding to post 1300 may have a similar shape as and/or dimensions similar to post 1300. A PHOSITA would understand the relationship between post 1300 and a corresponding guide. This relationship may accommodate movement in one or more of the multiple degrees of freedom.

Figure 14:
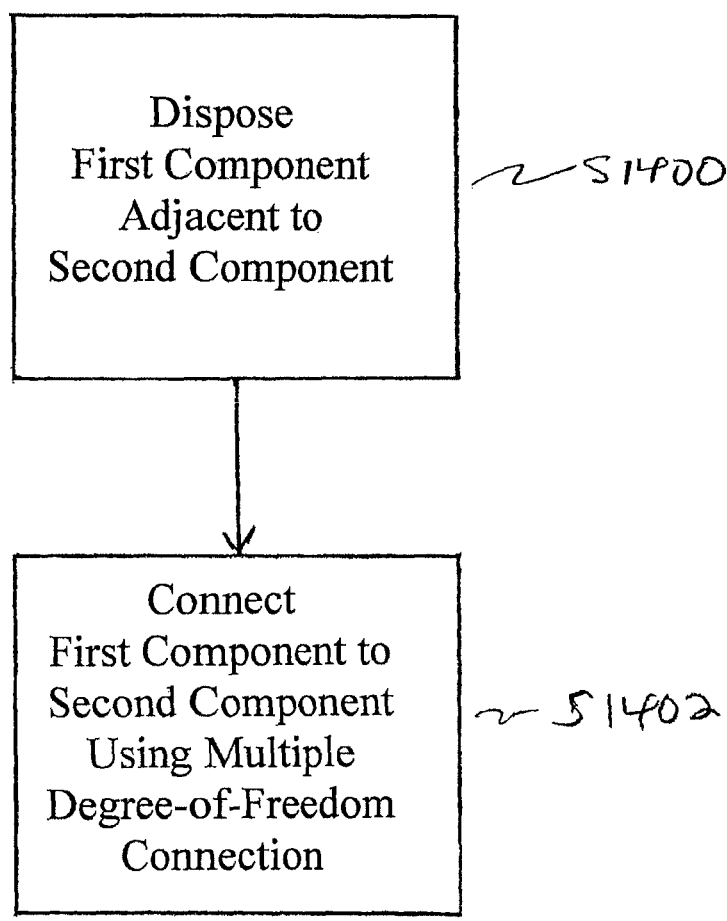
FIG. 14 is a flowchart of a method for establishing a mechanical connection between adjacent components of a system according to example embodiments.

FIG. 14 is a flowchart of a method for establishing a mechanical connection between adjacent components of a system according to example embodiments.

A method for establishing a mechanical connection between adjacent components of a system may include disposing a first component of the system adjacent to a second component of the system (S1400) and/or connecting the first component to the second component using a multiple-degree-of-freedom connection (S1402). The multiple-degree-of-freedom connection may have at least four degrees of freedom.

Disposing a first component of the system adjacent to a second component of the system means disposing the first component close enough to the second component so that the first and second components may be connected using the multiple-degree-of-freedom connection.

While example embodiments have been particularly shown and described, it will be understood by those of ordinary skill in the art that various changes in form and details may be made therein without departing from the spirit and scope of the present invention as defined by the following claims.

What is claimed is:

1. A core spray sparger T-box attachment assembly for a nuclear reactor pressure vessel, the pressure vessel including a shroud, a sparger T-box penetrating the shroud, a plurality of sparger distribution header pipes coupled to the sparger T-box, and a downcomer pipe, the sparger distribution header pipes including at least one sparger nozzle, the attachment assembly including a downcomer pipe coupling and a sparger T-box clamp, the sparger T-box clamp comprising:
   an anchor plate having a draw bolt opening to receive a draw bolt;
   a first clamp block substantially aligned at a first end of the anchor plate; and
   a second clamp block substantially aligned at a second end of the anchor plate;
   wherein the anchor plate is connected to the first clamp block by a first multiple-degree-of-freedom connection,
   wherein the first multiple-degree-of-freedom connection prevents relative linear movement between the anchor plate and the first clamp block in a plane including the anchor plate and the first clamp block, and
   wherein the anchor plate is connected to the second clamp block by a second multiple-degree-of-freedom connection.

2. The attachment assembly of claim 1, wherein the first multiple-degree-of-freedom connection has at least two degrees of freedom.

3. The attachment assembly of claim 1, wherein the first multiple-degree-of-freedom connection has at least two degrees of freedom that include one or more of roll, pitch, and yaw.

4. The attachment assembly of claim 1, wherein the first multiple-degree-of-freedom connection has at least two degrees of freedom that include two or more of roll, pitch, and yaw.

5. The attachment assembly of claim 1, wherein the first multiple-degree-of-freedom connection has at least three degrees of freedom.

6. The attachment assembly of claim 1, wherein the first multiple-degree-of-freedom connection has at least three degrees of freedom that include two or more of roll, pitch, and yaw.

7. The attachment assembly of claim 1, wherein the first multiple-degree-of-freedom connection has at least three degrees of freedom that include roll, pitch, and yaw.

8. The attachment assembly of claim 1, wherein the first multiple-degree-of-freedom connection has four degrees of freedom.

9. The attachment assembly of claim 1, wherein the first multiple-degree-of-freedom connection has four degrees of freedom that include roll, pitch, and yaw.

10. The attachment assembly of claim 1, wherein the first multiple-degree-of-freedom connection has at least two degrees of freedom, and
    wherein the second multiple-degree-of-freedom connection has at least two degrees of freedom.

11. The attachment assembly of claim 1, wherein the first multiple-degree-of-freedom connection has at least three degrees of freedom, and
    wherein the second multiple-degree-of-freedom connection has at least three degrees of freedom.

12. The attachment assembly of claim 1, wherein the first multiple-degree-of-freedom connection has four degrees of freedom, and
    wherein the second multiple-degree-of-freedom connection has at least four degrees of freedom.

13. The attachment assembly of claim 1, wherein the first multiple-degree-of-freedom connection includes:
  a post connected to the anchor plate;
   wherein the post fits into a guide in the first clamp block to form the multiple-degree-of-freedom connection.

14. The attachment assembly of claim 1, wherein the first multiple-degree-of-freedom connection includes:
  a post connected to the first clamp block;
   wherein the post fits into a guide in the anchor plate to form the multiple-degree-of-freedom connection.

15. A core spray sparger T-box attachment assembly for a nuclear reactor pressure vessel, the pressure vessel including a shroud, a sparger T-box penetrating the shroud, a plurality of sparger distribution header pipes coupled to the sparger T-box, and a downcomer pipe, the sparger distribution header pipes including at least one sparger nozzle, the attachment assembly including a downcomer pipe coupling and a sparger T-box clamp, the sparger T-box clamp comprising:
  an anchor plate having a draw bolt opening to receive a draw bolt;
  a first clamp block substantially aligned at a first end of the anchor plate; and
  a second clamp block substantially aligned at a second end of the anchor plate;
  wherein the anchor plate is connected to the first clamp block by a first multiple-degree-of-freedom connection,
  wherein the first multiple-degree-of-freedom connection prevents relative linear movement between the anchor plate and the first clamp block in a plane including the anchor plate and the first clamp block,
  wherein the anchor plate is connected to the second clamp block by a second multiple-degree-of-freedom connection, and
  wherein the second multiple-degree-of-freedom connection prevents relative linear movement between the anchor plate and the second clamp block in a plane including the anchor plate and the second clamp block.

16. The attachment assembly of claim 15, wherein the first multiple-degree-of-freedom connection includes:
  a post connected to the anchor plate;
   wherein the post fits into a guide in the first clamp block to form the multiple-degree-of-freedom connection.

17. The attachment assembly of claim 15, wherein the first multiple-degree-of-freedom connection includes:
  a post connected to the first clamp block;
   wherein the post fits into a guide in the anchor plate to form the multiple-degree-of-freedom connection.

18. A core spray sparger T-box attachment assembly for a nuclear reactor pressure vessel, the pressure vessel including a shroud, a sparger T-box penetrating the shroud, a plurality of sparger distribution header pipes coupled to the sparger T-box, and a downcomer pipe, the sparger distribution header pipes including at least one sparger nozzle, the attachment assembly including a downcomer pipe coupling and a sparger T-box clamp, the sparger T-box clamp comprising:
  an anchor plate having a draw bolt opening to receive a draw bolt;
  a first clamp block substantially aligned at a first end of the anchor plate; and
  a second clamp block substantially aligned at a second end of the anchor plate;
  wherein the anchor plate is connected to the first clamp block by a first multiple-degree-of-freedom connection,
  wherein the anchor plate is connected to the second clamp block by a second multiple-degree-of-freedom connection, and
  wherein the first and second multiple-degree-of-freedom connections prevent relative linear movement between the first clamp block and the second clamp block in a plane including the first clamp block and the second clamp block.

19. The attachment assembly of claim 18, wherein the plane including the first clamp block and the second clamp block also includes the anchor plate.

20. The attachment assembly of claim 19, wherein the first and second multiple-degree-of-freedom connections prevent relative linear movement between the anchor plate, the first clamp block, and the second clamp block in the plane including the anchor plate, the first clamp block, and the second clamp block.

* * * * *